United States Patent

[11] 3,596,095

[72] Inventor Sam L. Leach
 32653 Seagate Drive, Palos Verdes
 Peninsula, Calif. 90274
[21] Appl. No. 786,041
[22] Filed Dec. 23, 1968
[45] Patented July 27, 1971
 Continuation-in-part of application Ser. No.
 738,018, June 18, 1968, now abandoned.

[54] OPTICALLY STIMULATED FLUORESCENT
 LIGHTING SYSTEM
 18 Claims, 8 Drawing Figs.
[52] U.S. Cl. .................................................. 250/71 R,
 250/80, 252/301.4 R
[51] Int. Cl. ....................................................... G01n 21/38
[50] Field of Search ............................................ 250/71, 80;
 156/67; 161/410; 252/301.4, 301.6

[56] References Cited
UNITED STATES PATENTS

| 2,430,232 | 11/1947 | Lynch | 250/71 X |
| 2,879,614 | 3/1959 | Baldanza | 250/71 X |
| 2,901,647 | 8/1959 | Thomas et al. | 313/109 X |

Primary Examiner—Archie R. Borchelt
Assistant Examiner—Davis L. Willis
Attorney—Lilling & Siegel ABSTRACT: A novel fluorescent lighting system is disclosed wherein gas discharge radiation is utilized to excite luminescence of inorganic solids suspended in a medium of organically activated polymers, physically displaced from the normal relative position with respect to the excitation wave front radiation. A unique blend of gases are utilized within the discharge tube and particular activators are utilized in a novel combination with the phosphor materials such that the luminescent mechanism within the phosphors is optically stimulated thus greatly increasing the efficiency of the light-producing process.

PATENTED JUL 27 1971
3,596,095
SHEET 1 OF 3
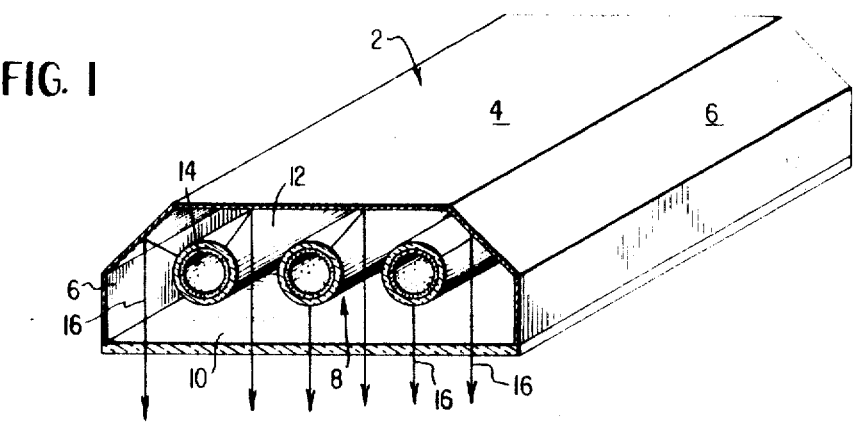
FIG. 1
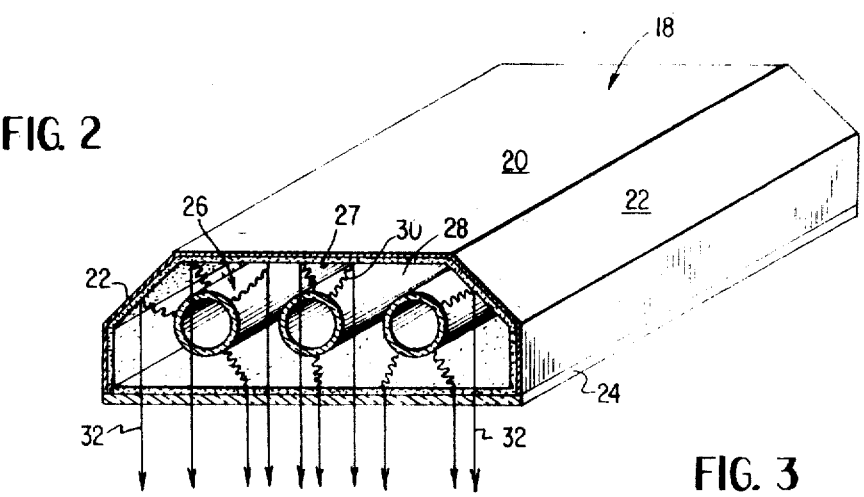
FIG. 2
FIG. 4
FIG. 3
FIG. 5
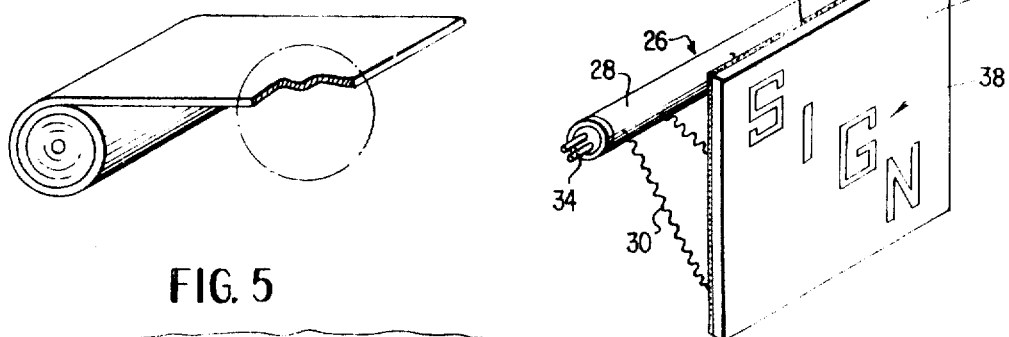
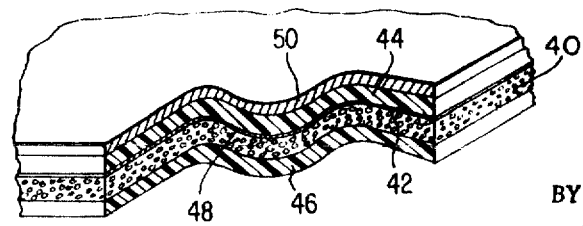
INVENTOR
SAM L. LEACH
BY Jacobi and Davidson
ATTORNEYS.

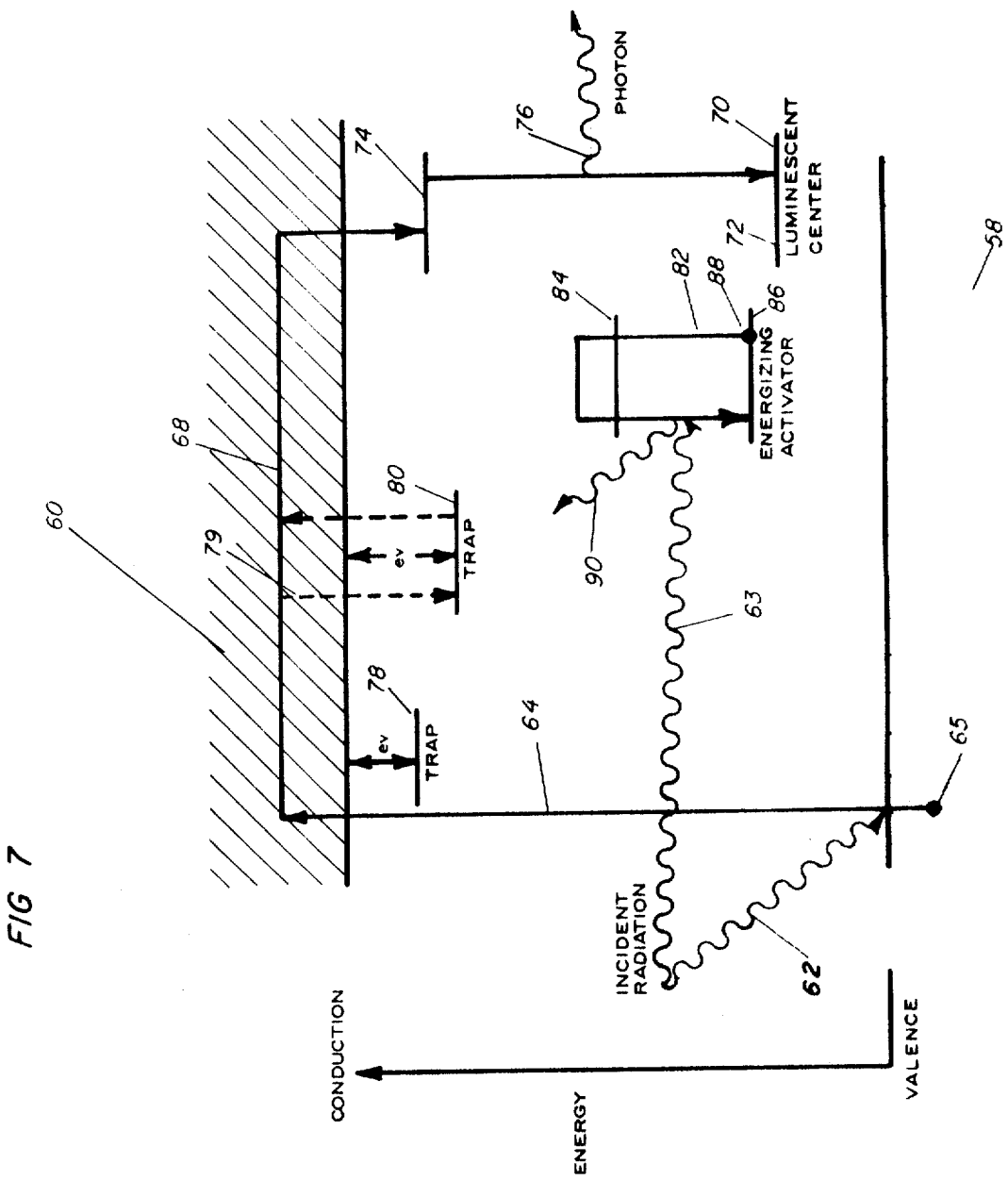

OPTICALLY STIMULATED FLUORESCENT LIGHTING SYSTEM

This application is a continuation-in-part of my prior application Ser. No. 738,018, filed June 18, 1968 now abandoned.

The instant invention generally relates to fluorescent lighting means and particularly concerns a system utilizing gas discharge radiation to excite luminescence of inorganic solids suspended in a medium of organically activated polymers, physically displaced from the normal relative position with respect to the excitation wave front radiation. The instant invention departs from the scope of the invention disclosed in my prior application Ser. No. 738,018 in that "optical stimulation" of the luminescence of the inorganic solids is achieved. As a result, the efficiency, versatility, quality, and actual light output of the system is raised to levels heretofore unapproachable by prior art techniques.

The objectives to be achieved by any suitable lighting system are obvious and, of course, comprise the ultimate goal of lighting engineers. A suitable illuminating system must provide adequate visibility such that all human tasks can be performed with maximum standards of speed and accuracy. A suitable lighting system must further provide lighting levels that will permit a person to work with minimum effort. Additionally, a suitable lighting system must provide lighting conditions that result in maximum safety and in the elimination of any visual discomfort. Importantly, these objectives must be met with a maximized efficiency and preferably, with a minimum cost.

Prior art systems attempting to meet these goals have generally relied upon fluorescent lighting techniques utilizing standard fluorescent tubes of known type generally comprising a glass-walled gas discharge tube effective to internally generate ultraviolet radiation. The glass discharge tube normally has an energy converting phosphor coating on the inside surface of the glass wall thereof which transforms the impinging ultraviolet radiation into visible light rays which then pass through the transparent glass of the tube. The tube glass, however, is normally not transparent to ultraviolet radiation and thus any excess of ultraviolet radiation is blocked. Lighting fixtures and housings of the type commonly in use today and designed with the technology of the prior art normally contain two, three, or more of the standard fluorescent tubes and such housings or fixtures normally comprise light reflectors.

The efficiency of the above-described standard fluorescent lighting fixtures, although much higher than incandescent lighting arrangements, still remains quite poor. With the typical prior art fluorescent tube, for example, fully 78 watts of 100-watt input excitation is converted into heat, while only 22 watts of the 100-watt input are actually converted into visible light. Under conditions of equilibrium in a standard fluorescent tube, about 60 percent of the 78 watts converted into heat is removed by conduction and convection and approximately 40 percent of this heat is removed by radiation. Yet, this heat removal ratio is largely dependent on the actual temperature of the fluorescent tube itself and on its placement in a given housing. Under normal conditions, the housing of the lighting fixture acts as a heat sink carrying off the heat produced at the wall of the fluorescent tube. Unless this heat sink is adequate, the temperature of the discharge tube gradually rises producing a number of deleterious effects as will be discussed below.

The standard fluorescent tube utilizes mercury vapor as the gas, and any significant heat accumulation in the tube will shift the mercury resonance line away from the 2,537 A. normal output, such shifting, of course, seriously affecting the quantum output efficiency. Heat accumulation in the tube has a further degrading effect on most luminescent phosphors utilized inside the fluorescent tube. Heat accumulation also places an additional burden on the air-conditioning equipment as well as at the ballast circuitry used to drive the tube. In short, gradual heat accumulation such as is normally produced in standard design fluorescent lamps, is a very considerable hazard which leads to lamp failure, ballast failure, other electrical hazards, and/or an overloaded air-conditioning system.

The physical configuration of prior art standard fluorescent tubes, and particularly the placement of the phosphor particles on the inside wall of the tube, leads to still further disadvantages. The phosphor particles, when placed on the inside surface of the discharge tube, are in direct contact with the hot gases or mercury vapors therein, the gases and vapors having a strongly degrading effect on the phosphor particles resulting in a further loss of efficiency of the lighting unit and a further lessening of the usable lifetime of the unit itself.

Prior art fluorescent lighting configurations suffer still another disadvantage in that since the phosphor particles are placed on the inside surface of the discharge tube, the shape and dimensions of the light-emitting area is confined to the shape of the tube itself, and in any event, can be no larger than the area of the inside surface of the discharge tube. Accordingly, if the lighting engineer or other use of standard fluorescent tubes was desirous of providing a complete area of light such as a wall or the like, special light-distributing panels normally had to be utilized which, in addition to adding to the expense of the prior art lighting system, further decreased the lighting efficiency thereof.

Given this state of the art, the invention disclosed in my prior U.S. Pat. application Ser. No. 738,018, which disclosure is to be considered as incorporated herein, can be considered in its proper perspective and recognized as a significant advance in lighting system techniques and concepts which serves to eliminate most, if not all, of the disadvantages of the conventional systems discussed above. This prior invention utilized gas discharge radiation, such as ultraviolet radiation, to excite luminescence of inorganic phosphor solids suspended in a medium or film of organically activated polymers, the film containing the phosphor particles being physically displaced from the normal relative position with respect to the excitation wave front. The luminescent material utilized was constructed as a pliable, thin-film web or sheet, preferably provided with adhesive means on one surface thereof such that the web or sheet could be placed upon virtually any surface which was desired to emit light. Specifically, the thin-film luminescent web or sheet disclosed in my prior application was contemplated to be placed on the inside surface or surfaces of a standard lighting fixture of the type previously in use for the standard fluorescent tubes. However, the standard fluorescent tubes were replaced with a mercury discharge tube having no phosphor coating on the inside walls thereof and further, having walls constructed of a glass material which would pass predetermined ultraviolet radiation into the housing of the lighting fixture, the ultraviolet radiation being converted by the thin-film luminescent web or sheet into visible light.

By virtue of my prior invention, the efficiency of the lighting system as a whole was greatly increased. For one, the mere removal of the phosphor materials from the inside of the discharge tube provided, in and of itself, a marked advance in the prior art since the phosphor particles, not being in contact with hot gases, were not degraded by the same. Further, the light-emitting area of the lighting fixture was not limited to the shape of the discharge tube utilized as was the case with standard, conventional lighting arrangements, since the thin-film phosphorescent web or sheet could be placed on any surface upon which the ultraviolet radiation from the discharge tube would impinge to effectively convert such surface itself into a light-emitting area.

Yet, even with this new approach in lighting technique as evidenced by my prior invention, the ultimate goals and objectives of an illuminating system as set forth above, although approached, were not actually realized. No significant attempt was made in the invention disclosed in my prior application to actually increase the efficiency and quality of the luminescent mechanism and process itself. Thus, even with my prior inventive lighting system, the actual production of visible light relied upon by the well-known techniques of ultraviolet excitation of a luminescent material with activators therein for the known purpose of providing luminescent or recombination centers for the generation of visible light.

The instant invention has, as its primary object, the provision of a novel lighting system which, while utilizing the basic principles and concepts of my prior invention, also serves to actually increase the light-emitting efficiency of the phosphor coating or film itself. Thus, with the same amount of input power to the lighting system, and particularly to the discharge tube utilized to create the excitation energies for the phosphor, a marked increase in the actual lumen output from the phosphor itself would be achieved.

Further, more specific, though equally important objects of the subject invention are:

a. To provide a novel fluorescent lighting system wherein the luminescent phosphor material is physically disposed at a location wherein the degrading effects of the hot gases within the gas discharge tube are eliminated;

b. To provide a novel lighting system wherein the generation of harmful heat is reduced to a minimum;

c. To provide a novel lighting system having an extremely high lighting efficiency far in excess of lighting efficiencies previously thought possible;

d. To provide a novel lighting system having an extremely long and useful life;

e. To provide a novel lighting system wherein virtually any surface upon which an excitation wave front impinges can be made to emit visible light;

f. To provide a novel lighting system incorporating novel and far more efficient techniques in the luminescent mechanism within the phosphor material;

g. To provide a lighting system wherein the characteristics and quality of the light emitted from the phosphor can be closely controlled;

h. To provide a lighting system having a low cost of manufacture and maintenance; and, i. To provide a lighting system having virtually unlimited versatility in its field of application.

The above objects as well as other objects, features, and advantages of the instant invention which will become apparent as the description proceeds, are implemented by the subject invention which utilizes gas discharge radiation to excite luminescence of inorganic phosphor solids which are suspended in a medium or film of organically activated polymers, the film containing the phosphor particles being physically displaced from the normal relative position with respect to the excitation wave front radiation. In the preferred physical arrangement of the instant invention, the luminescent material is constructed as a pliable, thin-film web or sheet, and adhesive means are preferably provided on one surface thereof. In this manner, the luminescent material can be placed upon virtually any surface from which light is desired to be emitted. For example, and in accordance with the inventive concepts herein, the thin-film luminescent web or sheet is placed on the inside surface or surfaces of a standard lighting fixture of the type now in use that normally utilize the conventional, standard fluorescent tubes. However, the standard fluorescent tubes are replaced with a gas discharge tube having no phosphor coating on the inside walls thereof and further having walls constructed of a glass material relatively transparent to ultraviolet radiation as well as radiation of other frequencies as will be discussed hereinbelow, the radiation emanating from the discharge tube being converted by the thin-film luminescent web or sheet into visible light through a novel luminescent mechanism provided by the structure of the phosphor itself.

The actual physical surface or configuration upon which the thin-film luminescent web or sheet is placed is by no means critical to the instant invention as the thin-film luminescent web or sheet may be placed on any surface upon which the radiation emanating from the discharge tube can impinge.

Significantly, and of critical importance to the instant invention, is the provision of a novel luminescent mechanism created within the phosphor itself which greatly increases the efficiency of energy conversion into visible light. From a conceptual standpoint, the instant invention utilizes the principle of optical stimulation as applied to phosphorescent crystals so as to release, as visible light, energy created and stored within the crystal that normally is effectively lost to the light-producing process. Although the exact operation of this optical stimulation of the luminescent mechanism is not exhaustively understood, such mechanism may be postulated as follows. Due to imperfections and impurities in a phosphor crystal, a number of so-called energy "traps" or "metastable" levels are created in close proximity to the energy level of the so-called "conduction" band of the phosphor crystal in the "forbidden" region thereof. Electrons excited from the so-called "valence" band of the phosphor crystal may be "trapped" in these metastable states and, as a result, do not readily migrate to recombination or luminescent centers provided within the phosphor by known activator impurities so as to produce visible light. The instant invention serves to release electrons trapped in the metastable state into the conduction band of the phosphor crystal such that these now released electrons recombine (with holes) at a luminescent center to emit light which would otherwise not be immediately or effectively available.

From a structural standpoint, the instant invention contemplates the provision of phosphor materials having activator materials therein in combinations and for purposes heretofore unknown in the prior art. Additionally, the instant invention contemplates the provision of a gas discharge tube containing mixtures of mercury vapor along with noble gases such that the radiation emanating from the discharge tube contains frequencies, not only within the ultraviolet region utilized for the primary production of light, but also within the near visible and visible region which are utilized to actually optically stimulate the crystal to effect the release of electrons trapped in metastable energy levels therein.

The invention itself will be better understood, and its mode of operation and advantages better appreciated from the following detailed description of preferred embodiments thereof, such description making reference to the appended drawings, wherein:

FIG. 1 is a perspective view of a lighting fixture which utilizes prior art standard fluorescent tubes;

FIG. 2 is a perspective view of a preferred structural embodiment of the invention with the prior art fluorescent tubes being replaced by a gas discharge tube containing mercury vapor and noble gases therein, and with a thin film of luminescent material being provided on the inner surface of the actual housing;

FIG. 3 is a perspective view of a further embodiment of the subject invention wherein a thin-film luminescent web or sheet is displaced on a typical back-lighted sign in the path of impinging radiation;

FIG. 4 is a perspective view of a roll or web of the thin-film luminescent material of the subject invention;

FIG. 5 is an exploded view of the structural details of the thin-film luminescent web or sheet of FIG. 4 contained within the circle, portions of the exploded view being shown broken away and in elevational section for illustrative clarity;

Figure 8:
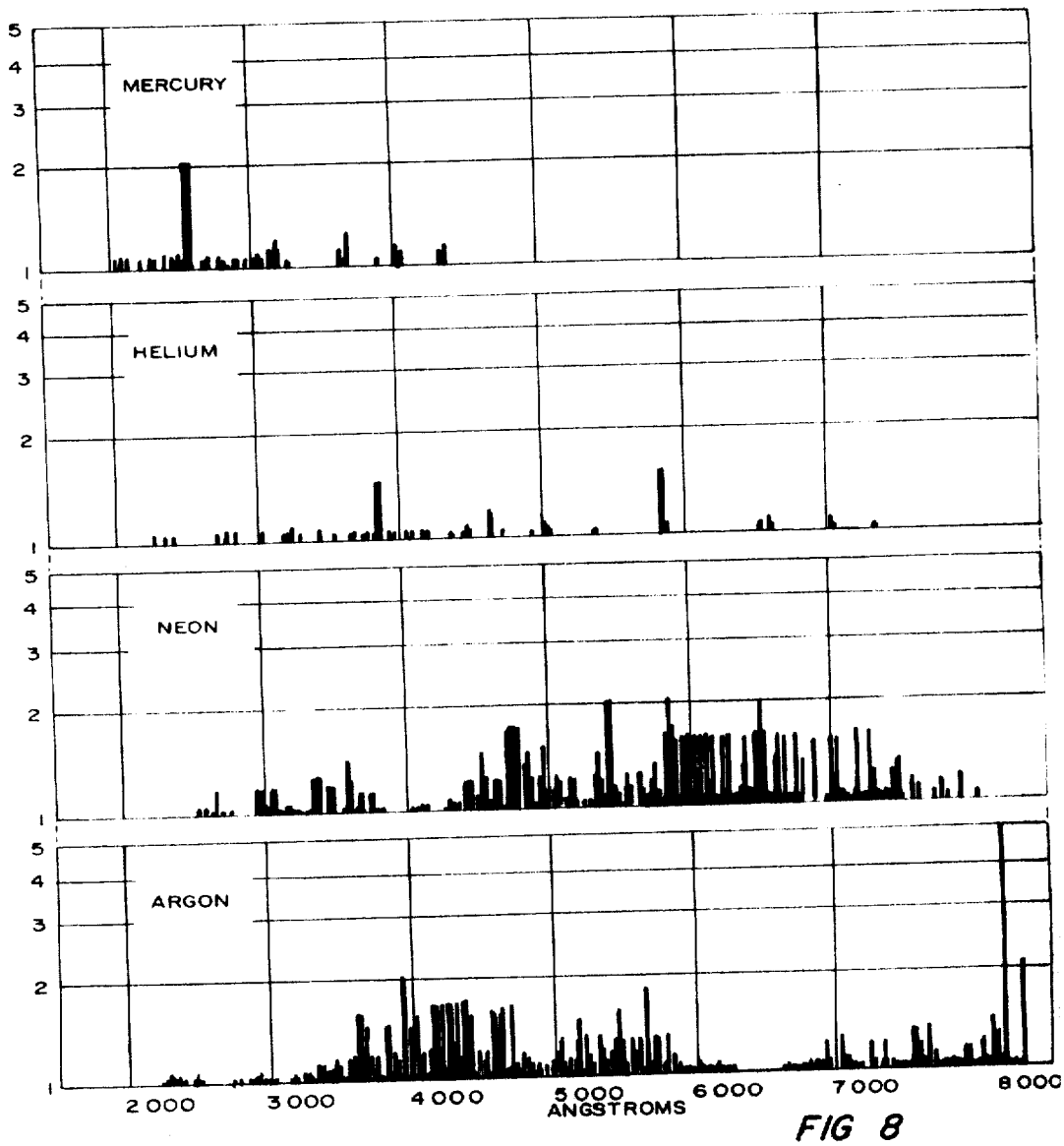
Figure 6:
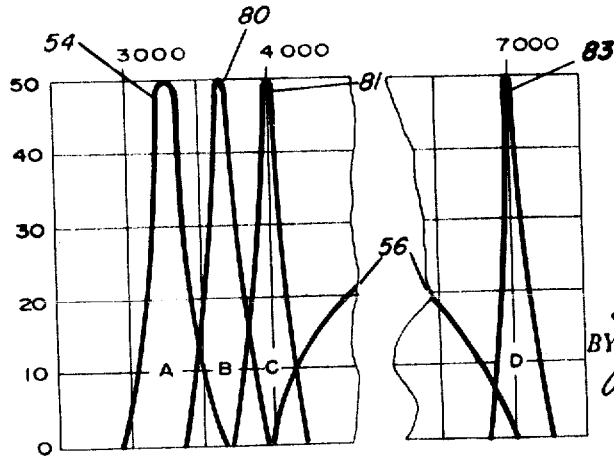

FIG. 6 schematically depicts absorption and emission characteristics of a typical phosphor material;

FIG. 7 is a schematic illustration of various energy levels within a phosphor crystal and of the physical luminescent mechanism depicting the effect and operation of optical stimulation; and, FIG. 8 is a graphical illustration of the various spectral frequencies and intensities generated by the discharge lamp of the instant invention.

Describing now the drawings, attention is initially directed to FIG. 1 thereof wherein a typical, prior art standard fluorescent lighting unit is disclosed. The lighting unit generally comprises a housing 2 having a top wall 4 and sidewalls 6 generally constructed in a light-reflecting configuration or shape. A plurality of fluorescent tubes 8 are provided in the housing in well-known fashion. The bottom portion of the housing is provided with a prismatic surface 10, surface 10 either being transparent to visible light or at least translucent thereto.

As shown, each fluorescent tube 8 comprises an elongated glass tube 12 having nonillustrated electrodes at both ends thereof. The elongated tube 12 is hollow and is normally filled with a gas such as mercury. A phosphor coating 14 is provided on the inside surface of the glass tube 12. Now, when the fluorescent tube 8 is started, the electrical discharge produces ultraviolet radiation through the medium of the mercury vapor in well-known fashion, the ultraviolet radiation through the medium of the mercury vapor in well-known fashion, the ultraviolet radiation normally being centered about a peak of 2,537 A. comprising the well-known mercury resonance line. The ultraviolet radiation generated within the tube 12 impinges upon the phosphor coating 14 on the inside surface thereof, and the phosphor coating 14, also in well-known fashion, serves to convert the impinging ultraviolet radiation to visible light, the conversion process being in accordance with the standard luminescent mechanisms and being undertaken with certain well-known efficiency levels. Accordingly, quantums of visible light schematically illustrated by the arrowed lines 16 are emitted through the wall of the glass tube 12 and either pass directly through the prismatic surface 10 of the lighting unit 2 or are variously reflected from the upper surface 4 of the walls 6 of the housing.

As discussed in some detail above, however, this prior art construction suffers a multiplicity of disadvantages. A very large quantity of heat is generated by each of the fluorescent tubes 8 at the walls of the respective glass tubes 12 and therefore, at the location of the phosphor coating 14. This heat has a quite degrading effect both on the quality and life of the phosphor particles of the coating 14 and thus on the quality of light emanating from each tube 8. Further, the light-producing area and shape of such a prior art construction is limited to the area and shape of the inside surface of the glass tube 12, since it is only upon this surface that a phosphor coating is applied. Accordingly, the efficiency of this prior art construction with respect to light actually generated from a given amount of input power is surprisingly low. Since the phosphor coating 14 placed on the inside surface of the glass tube 12 is in direct contact with the hot mercury vapors of the tube, a certain degradation of the phosphor particles takes place due to mercury absorption, further reducing the efficiency and life of the tube. Additionally, the prior art structure relies upon the standard luminescent mechanisms within the phosphor itself and thus is inherently limited in its light-producing efficiency.

Referring now to FIG. 2, a preferred structural embodiment of the subject inventive lighting system is disclosed as it is applied to a more or less standard lighting housing. In a similar fashion as with the lighting fixture of FIG. 1, the lighting fixture of FIG. 2 also comprises a housing 18 having a top wall 20 and sidewalls 22 constructed in a light-reflecting configuration. A prismatic surface 24 is again provided at the bottom opening of the housing 18, the prismatic surface 24 again being transparent or at least translucent to visible light. A plurality of discharge tubes 26 are also provided in spaced relation within the lighting housing 18. However, the discharge tubes 26 are not standard fluorescent tubes as was the case in FIG. 1, although the outward physical construction of the tubes is very similar thereto. The discharge tubes each comprise an elongated hollow glass tube 28, the glass tube 28 again containing mercury vapors as well as noble gases as will be discussed below. However, no phosphor coating is provided on the inside surface or walls of the glass tubes 28 and further, the glass tubes 28 are constructed of a material such as Vycor, or Pyrex or a suitable lime glass having approximately 60 percent of the magnesium oxide removed and replaced by pure silica such that the ultraviolet radiation produced by the mercury gas discharge therein as well as other radiation having longer wavelengths passes through the wall of the tube. As will be recalled, this structure is contrasted to the fluorescent tube structure of the prior art which utilizes a glass tube which is transparent to visible light but which has very low-transmission characteristics for ultraviolet radiation.

A thin film of luminescent material 27 is placed on the inside surface of the lighting housing 18, both on the inside surface of the upper walls 20 and the sidewalls 22 thereof, as well as upon the inside surface of the prismatic cover or plate 24. The detailed physical construction of the luminescent film 27 will be discussed hereinbelow.

The general mechanics of the production of light utilizing the inventive embodiment of FIG. 2 is such that the gas discharge within the tubes 26 produces predetermined radiations which pass through the glass walls 28 of each tube 26 as schematically depicted by lines 30. Each quantum of radiation strikes an area of the luminescent thin-film coating 27 wherein the luminescent coating 27 converts the incoming quantum of energy 30 into light rays designated by the arrowed lines 32. However, and as will become apparent, the instant invention contemplates a modification of the basic light-producing mechanics within the luminescent coating.

The configuration of the instant invention as disclosed in FIG. 2 has manifold advantages over that of the prior art as represented by FIG. 1. For one, the thin-film luminescent layer 27 no longer is on the inside surface of the tube 28 and accordingly, is no longer in contact with the hot mercury vapors and gases therein. Thus, with the inventive embodiment, there is no problem whatsoever of absorption of mercury vapors by the phosphor. Additionally, because the phosphor particles are removed from the walls 28 of the tubes, the phosphor particles are not subjected to a large amount of heat. Rather, the heat that is generated in the phosphor particles by virtue of the conversion process of the ultraviolet energy into radiant visible light, is generated over a much greater area and thus, each individual phosphor particle is subjected only to a low level of heat. Further, and as should be readily apparent, the actual light-producing area of the novel lamp configuration of FIG. 2 is greatly increased over that of the fixture of FIG. 1 since the light-producing area is not constrained to that of the inside surface of the glass wall of each fluorescent tube, but rather can comprise the entire inside surface of the actual housing 18. Accordingly, the inventive structure of FIG. 2 exhibits a much higher lighting efficiency for the same input power than would be exhibited by the structure of FIG. 1.

It is to be noted that the thin-film luminescent sheet or web 27 is also transparent to light, and it is for this reason that the wen 27 can also be placed on the bottom surface, that is on the prismatic plate 24 of the lighting housing 18, as all visible light generated by the other areas within the housing 18 will be transmitted through the thin-film phosphors located on the prismatic plate 24 and then radiated into the room. Accordingly, even greater lighting efficiency is effected.

As mentioned above, the exact physical configuration of the placement of the thin-film luminescent web or sheet 27 with respect to the source of the incident radiation 26 forms no critical part of the subject invention, since all that is required is that the luminescent film be placed upon any surface in the path of such radiation.

A further example of a structural configuration in accordance with the concepts of the subject invention is depicted in FIG. 3. Here, the use of the novel thin-film luminescent web or sheet of the subject invention in a back-lighted sign environment is depicted.

The thin-film luminescent web or sheet 27 is adhesively bonded or applied to the back of a transparent or at least translucent panel or plate 36 having a plurality of letters forming a sign generally designated 38 on one surface thereof. A source of radiation, primarily but not exclusively ultraviolet, again generally designated 26 is provided in the back-lighted sign arrangement and is seen to comprise the elongated hollow glass tube 28 filled with mercury and noble gases and having electrodes 34 at both ends thereof. It is contemplated that the tube 26 be of the hot-cathode type and have a relatively low mercury vapor pressure as efficiency of particular ultraviolet wavelength production has been found to decrease as the vapor pressure increases. The wall 28 of the tube 26 is, as described above, constructed of a glass which would be substantially transparent to ultraviolet radiation and radiation having longer wavelengths. Glasses that fit this purpose are quartz, Vycor, Pyrex or the like. As the radiation 30 strikes the phosphor particles contained within the thin-film luminescent web or screen 27, the radiant energy is converted into visible light which would then pass through the adhesive coating bonding the thin film 27 to the sign plate 36 to produce a back-lighting effect for the sign letters 38. Harmful ultraviolet radiation would not be transmitted through the sign plate 36 due to the construction of the material thereof and also due to the fact that the adhesive contemplated for use, although transparent to visible light, does not have a high transmission efficiency for energy in the ultraviolet range.

As should readily be apparent, the possibilities of different environments and different configurations in which the thin-film luminescent web or sheet 27 could be utilized is almost limitless. Entire walls or ceilings of a room or building could quite easily be lighted in a highly efficient and safe manner merely by placing the thin-film luminescent web or sheet thereon and providing an external radiation source.

FIG. 4 and 5 of the drawings depict a particular preferred construction of the thin-film luminescent web or sheet of the subject invention. As shown in FIG. 4, the thin-film sheet is contemplated to be quite flexible to facilitate handling and could comprise a roll that could be unwound to any suitable length and cut by the user to any suitable size in accordance with his needs. FIG. 5 is an expanded, partially in section view of the portion of the thin-film web or sheet contained within the circle of FIG. 4.

The preferred construction of the thin-film web or sheet is seen to comprise a plurality of layers, the overall sheet having a thickness of approximately 5 mils. A central layer 40 is provided and preferably comprises polyvinyl fluoride such as Tedlar and/or a polyvinyl alcohol film utilized as a carrier for phosphor particles 42 embedded therein. The polyvinyl fluoride or film is utilized as a carrier material since it is transparent to both visible light as well as ultraviolet radiation and, more importantly, is structurally unaffected by the impingement of ultraviolet radiation. The thickness of the central layer 40 is contemplated to be within the range of 10 to 100 microns.

Polyvinyl alcohol film used as a carrier for the phosphors, although having the properties of being transparent to visible and ultraviolet radiation as well as being unaffected by ultraviolet radiation, has the characteristic that it is easily dissolvable by water. Even the polyvinyl fluoride film carrier should be physically protected. Accordingly, a weatherproof coating is contemplated to be preferably applied to both sides of the carrier 40. As shown in FIG. 5, coatings 44 and 46 are placed on either side of the polyvinyl fluoride or alcohol base and are contemplated to also comprise polyvinyl fluoride. The polyvinyl fluoride coatings 44 and 46 serve to protect the polyvinyl fluoride and/or polyvinyl alcohol carrier film 40 and specifically, to weatherproof the same. Polyvinyl fluoride and polyvinyl alcohol are transparent to both visible light as well as to ultraviolet radiation and are also chemically inert to the impinging ultraviolet radiation. The thickness of the polyvinyl fluoride coatings 44 and 46 is contemplated to be within the range of 1 to 3 mils, although this thickness could be varied as desired.

In one construction of the subject inventive thin-film luminescent web or sheet, a further layer designated 48 is provided between the phosphor carrier 40 and the upper polyvinyl fluoride weatherproofing layer 44. This additional coating 48 is contemplated to comprise a vacuum deposited aluminum layer having a very small thickness in the range of 200 to 500 A. units. The thin aluminum film is provided, if desired, as an extremely good reflector of ultraviolet radiation impinging thereon. Accordingly, ultraviolet radiation passing through the polyvinyl fluoride coating 46 into the phosphor carrier would excite some of the phosphor particles 42 and would be reflected by the thin aluminum coating back through the carrier to excite further phosphor particles 42. Thus, the provision of the aluminum film also serves to increase the efficiency of the light output, although, as stated above, the provision of this additional layer is not critical to the invention. Magnesium oxide and titanium dioxide could also be used instead of aluminum, if desired.

The thin-film luminescent web or sheet is, as stated above, contemplated to be placed upon virtually any surface which would intercept ultraviolet radiation. For this reason, an adhesive coating generally designated 50 is provided on one side of the luminescent web or sheet. The adhesive coating 50 preferably comprises an acrylic adhesive, the acrylic readily passing visible light but having a low transmission efficiency for ultraviolet radiation. The particular adhesive utilized need only be one that is transparent to visible light except where the aluminum reflector is utilized and be adherable to the polyvinyl fluoride layer 44. In this regard, many silicones and epoxies as well as acrylics could be utilized. One particularly suitable form of adhesive for use as the adhesive coating 50 is that of the microencapsulated type which would be released only when the user pressed the luminescent film upon the desired surface.

There are a number of different methods which may be utilized in accordance with the subject invention to produce the thin-film luminescent web or sheet of FIGS. 4 and 5. In this regard, and as one alternative method, a polyvinyl alcohol carrier or film 40 would first be produced by casting polyvinyl alcohol carrying the phosphor particles 42 on a polished drum, for example, in accordance with well-known techniques. After the sheet of polyvinyl alcohol has thus been produced, such sheet could then be laminated to the polyvinyl fluoride films which as stated above, are commercially available under the trade name Tedlar, by use of any suitable laminating adhesive as discussed above. The polyvinyl fluoride layer itself is produced preferably through an extruding process or a casting process.

If desired, the aluminum film or layer 48 could be vacuum deposited on the polyvinyl fluoride film 44 prior to the lamination of the film 44 to the polyvinyl alcohol carrier 40. The acrylic adhesive layer 50, on the other hand, may be applied to the surface of the polyvinyl fluoride 44 via a roll-coating process although the acrylic adhesive layer could also be sprayed on, if desired.

An alternative method of making the thin-film luminescent web of the subject invention resides in first providing a polyvinyl fluoride layer 44 and then spraying the polyvinyl alcohol film carrier 40 containing the phosphor particles 42 onto the

TABLE I

| Phosphor | Color | Normal exciting range (angstroms) | Normal sensitivity peak (angstroms) | Normal emitted range (angstroms) | Normal emitted peak (angstroms) |
|---|---|---|---|---|---|
| Calcium tungstate | Blue | 2,200-300 | 2,720 | 3,100-7,000 | 4,400 |
| Magnesium tungstate | Blue-white | 2,200-3,200 | 2,850 | 3,600-2,700 | 4,800 |
| Cadmium silicate | Yellow-pink | 2,200-3,200 | 2,400 | 4,800-7,400 | 5,950 |
| Cadmium borate | Pink | 2,200-3,600 | 2,500 | 5,200-7,500 | 6,150 |
| Calcium phosphate | Blue (ultra) | 2,200-3,200 | 2,500-2,800 | 3,200-4,500 | 3,600 |
| Halophosphate | White | 1,800-3,200 | 2,500 | 3,500-7,500 | 5,800 | polyvinyl fluoride film. Alternatively, the polyvinyl alcohol carrier could be roll coated onto the polyvinyl fluoride layer.

A still further construction method would comprise the utilization of extrusion techniques.

Many different materials can be utilized for the phosphor particles 42 carried in the polyvinyl alcohol or fluoride base or film 40. Such material can be selected for its color-producing properties, and its sensitivity to the impinging ultraviolet radiation, as well as for other characteristics. Table 1 is illustrative of some of the materials generally found suitable for use with the subject invention, although it is to be expressly understood that other materials can be utilized and are discussed in more detail below with respect to the modified luminescent mechanism of the instant invention.

Just providing the above-described fluorescent system wherein the phosphors themselves are physically displaced from the normal relative position with respect to the excitation wave front radiation constitutes a major advance over prior art, conventional techniques and methods. The efficiency of such a lighting system wherein the phosphors are physically displaced from the inside of a fluorescent tube is markedly increased. Furthermore, the provision of the thin-film luminescent sheet or web as above described enables the user of the system to convert virtually any surface upon which radiation impinges into a surface which will emit visible light.

Yet, these novel structural deviations from the prior art do not constitute an end in themselves since any system which relies upon the conventional and known energy conversion processes within the phosphor itself is inherently limited as to its lighting efficiency. Thus, the instant invention further contemplates a modification to the luminescent mechanism of the energy conversion process and, specifically, contemplates an optical stimulation technique to effectively release, as visible light, energy created within the crystal by the impinging radiation thereon but normally trapped in the so-called "metastable" energy state.

As further background for the understanding of this optical stimulation process, the mechanics of luminescence will be briefly discussed hereinbelow. Basically, the phosphor crystal absorbs quantums of energy from the incident excitation wave front and particularly absorbs quantums of ultraviolet energy generated by a gas discharge tube. The absorption of this energy causes an electron from the valence band of the phosphor crystal to effectively be raised to an excited state within the conduction band of the crystal. The electron, as it is excited and moves to a higher energy level, leaves behind a hole within the conduction band of the crystal. The excited electron is capable of migrating throughout the whole space lattice of the crystal as is the case with the "hole" or absence of an electron left behind. When the migrating, excited electron reaches a luminescent or recombination center provided by activators within the phosphor crystal, the electron releases its energy in the form of a visible photon and recombines with the hole. The phosphor crystal is thus said to luminesce.

Yet, due to defects such as interstitial spaces and to chemical impurities, a plurality of electron energy "traps" are created near the luminescent center and the conduction band of the crystal. These "traps" comprise the "metastable" energy state of the crystal. Their presence within the crystal has a degrading effect on the luminescent qualities and properties thereof and thus serve to inherently limit the quantum efficiency of the light-producing mechanism. For example, an electron from the valence band of the phosphor crystal that has initially been excited by incident radiation might not migrate to a luminescent center wherein visible light would be emitted, but rather might fall into a "metastable" energy state or "trap".

The normal incident radiation, usually comprising ultraviolet frequencies, is not suitable to impart, to the "trapped" electrons, the proper energy so as to release the electron back into the conduction band whereby the electron can once again attempt to locate a luminescent center. Eventually, crystal vibrational effects and thermal agitation could cause these electrons to be released. Yet, such "trapped" electrons do not significantly contribute to the light-producing process occurring at the time of impingement of the incident excitation radiation and thus inherently limit the quantum efficiency of the phosphor crystal since the incident energy necessary to raise such electrons into the "metastable" state is effectively lost.

The excitation of an electron within the phosphor crystal is commonly known as "absorption" and the subsequent release of visible energy from the excited electron is commonly known as "emission" from the crystal. The physical process undertaken within the crystal between the absorption of the incoming energy and the subsequent emission or release of energy as visible light is the luminescent mechanism generally and briefly discussed above.

Reference is made here to FIG. 6 of the appended drawings wherein a typical "absorption-emission" curve of a phosphor crystal, such as zinc sulfide, is illustrated. The absorption characteristic or curve generally designated 54 and particularly the frequencies contained within this absorption curve are dictated by the molecular structure of the zinc sulfide phosphor itself and is a direct function of the amount of energy needed to raise an electron from the valence band to the conduction band of the phosphor crystal. For example, the energy difference between the valence and conduction bands of zinc sulfide is 3.7 ev. Solving Plancks equation $E=hv$, for the unknown $v$, where $v$ equals the frequency of a quantum of radiation, where $h$ equals Planck's constant, and wherein $E$ equals 3.7 ev., it will be seen that a quantum of incident radiation having a frequency of about 3,300 A. contains the necessary energy to excite the crystal. Corroborating this calculation by experimental data, the absorption curve for the zinc sulfide crystal, as illustrated in FIG. 6 of the drawings, indicates that this crystal will absorb energy, generally in the ultraviolet range, having wavelengths from about 3,000 A. to about 3,600 A. with a peak absorption occurring at about 3,300 A., as calculated. To all other frequencies of incoming radiation, the zinc sulfide crystal would generally be transparent. By similar calculations, the primary excitation or absorption frequency of any phosphor can be determined.

When an electron from the phosphor crystal has been excited by the absorbed quantum of incoming radiation, such electron, as briefly discussed above, migrates throughout the conduction band of the crystal until it is either trapped in a "metastable" energy state, or until it comes to a luminescent center. Such luminescent centers can be provided by dislocations or other defects inherently occurring within crystals such as is primarily the case with calcium and magnesium tungstates, but are normally provided by the addition of small amounts of chemical impurities in the crystal. Such chemical impurities are added in rather nominal percentages, the required quantity of which will vary within wide limits depending upon the desired characteristics of the emitted light, and are known as "activators". For example, calcium sulfide requires small traces of bismuth as the activator, zinc-berillium silicate and cadmium borate phosphors require very small amounts of manganese. On the other hand, zinc sulfide requires copper, silver, manganese, etc. activators, the quantity of copper needed here, for example, being of the order of 0.01 percent. Cadmium borate, for example, is activated with 0.1 percent of manganese, and zinc-berillium silicate requires a nominal 2 to 2.5 percent of manganese. The particular "activator" or chemical impurity required for a given phosphor material so as to create so-called luminescent centers has been the subject of much research and reference is herein made to the many available texts such as *Luminescence in Crystals*, D. Curie, Methuen and Co. Ltd., Great Britain, 1963.

The "activator" added to a given phosphor crystal produces the luminescent centers as discussed above and further fixes the color or frequency of the emitted visible energy. Thus, and again referring to FIG. 6, a typical "emission" curve 56 is illustrated for a zinc sulfide crystal activated with either copper, silver or manganese, as is known. Of importance, it should be noted that a true energy conversion process takes place within the crystal since the frequency of the incident radiation, such incident radiation normally being ultraviolet in nature, is converted into visible radiation of varying colors depending upon the particular "activator" added in known fashion. With the conventional or standard luminescent mechanism, the greatest overall efficiency is achieved when the incoming radiation is matched or constrained the have primary frequencies falling within the particular absorption curve of the given phosphor. Additionally, choice of the standard luminescent center providing "activator" or impurity within a given phosphor dictates the intensity and color of light emitted from the crystal, converted from the energy absorbed.

It should be noted that in most luminescent processes, the frequency of the emitted radiation is lower than the frequency of the incident radiation as is in accordance with Stokes' Law. At best, all that can be expected in the way of efficiency of the luminescent mechanism is for each quantum of incoming radiation to produce a quantum of emanated radiation. Yet, even if a full 100 percent quantum efficiency is somehow reached (only about 80 percent quantum efficiency being realized by most phosphors with the conventional luminescent mechanism due to heat loss, metastable states, and the like), the actual energy conversion efficiency from Stokes' Law and Planck's equation, is still considerably less and can be shown to be:

Efficiency = $(1-L_1/L_2) \times 100$ where $L_2$ is the wavelength of the emanated radiation and $L_1$ is the wavelength of the incident radiation. For example, if the incident UV radiation has a wavelength of 2,537 A., the primary resonance line of mercury, and the emanating radiation has a wavelength of 5,790 A., giving a visible orange-red color, then the maximum efficiency of the energy conversion process in this case would be only about 60 percent. Since the quantum efficiency of the luminescent mechanism is only about 80 percent in practice, rather than the 100 percent theorized here, the efficiency percentages for a given conversion of frequencies are actually much lower. The instant invention proposes to raise the quantum efficiency of energy conversion within the phosphor above the efficiency now being achieved in the art by modifying the luminescent mechanism itself, largely through recapturing, as visible light, energy stored and trapped in the metastable state.

As stated above, some of the electrons of the phosphor crystal become trapped in "metastable" states and cannot contribute to the immediate light-producing process. Thus, when utilizing a given phosphor having the normal "activators" or chemical impurities therefor, no internal mechanism is provided for "releasing" these trapped electrons in the metastable energy state such that these trapped electrons can themselves simultaneously contribute to the luminescing process. Since energy is taken from the incident excitation wave front to raise these electrons into a trap or metastable energy state, and since such electrons do not readily contribute to the light-producing process, this energy is essentially wasted. As a result, the quantum efficiency of the luminescing mechanism is limited as was discussed and is much reduced below that which would occur if all excited electrons contributed directly to the light-producing process. By virtue of an optical stimulation technique, the instant invention provides the required mechanism to "release" these trapped electrons so that these electrons do simultaneously contribute to the light-producing process.

Referring now to FIG. 7, a schematic illustration of various energy levels within a phosphor crystal is depicted. The phosphor crystal is illustrated as having a valence band 58 and a conduction band 60. Incident radiation generally designated 62 is provided from some external source and is utilized to excite an electron 65 from the valence band 58 into the conduction band 60 as schematically depicted by arrow 64. The wavelength of the incident radiation 62 to effect luminescence is fixed by the absorption characteristics of the particular crystal-activator system, as discussed above with reference to FIG. 6 and, for the usual phosphors, normally lies within the ultraviolet radiation range, as is known. A quantum of incident radiation 62, having a given fixed frequency within the UV ranges contains enough energy to just raise the electron 65 from the valence band to the conduction band. In other words, the energy of a quantum of incident radiation 62 is approximately the energy difference between the bottom of conduction band 60 and the top of the valence band 58, such energy difference, as discussed above, generally lying only within the ultraviolet range.

Once the electron has been raised along schematic path 64, into an excited state as evidenced by its placement in the conduction band 60, such electron can migrate or wander throughout the crystal lattice, the path of migration being schematically depicted by the arrow 68. Ideally, the electron 65 will find its way to a luminescent or recombination center generally designated 70 provided by the addition of a known chemical impurity "activator" or "activators" into the crystal structure.

The activator itself has a valence band or ground energy level generally designated 72 and an excited energy level or conduction band generally designated 74, the magnitudes of which are known. The electron 65, when it approaches the luminescent center generally designated 70, drops into the excited state 74 of such luminescent center 70. Thereafter, the electron drops from the excited state 74 into the ground state 72 of the luminescent center and releases a quantum or photon of energy designated 76 in the process. This emitted or released energy 76 has a wavelength normally above 4,000 A. or so and is in the form of a quantum or photon of visible light. The energy of the emitted photon is approximately equal to the energy difference between the excited level 74 and the ground level 72 of the activator providing the luminescent center 70.

If each incident quantum of radiation 62 directly provided an emitted photon or quantum of visible light 76 via the process described above, the maximum quantum efficiency of the energy conversion process within the phosphor would have been approached. Yet, certain electrons, as discussed above, do not reach a luminescent or recombination center 70. Rather, such electrons may find themselves "trapped" in various metastable energy states or levels depicted by reference numerals 78 and 80, for example. Again, it will be recalled that such "traps" or "metastable" states are generally caused by physical imperfections or impurities within the phosphor crystal and the energy levels of the metastable states for any given crystal is known or can be calculated and/or determined (See *Luminescence in Crystals*, cited above, *Luminescence of Inorganic Solids*, Goldberg). Thus, for purposes of illustration, it is assumed that an electron 65 excited by the incident radiation 62 into the conduction or excited energy level 60 of the crystal does not find its way to the luminescent center 70 but rather falls into a trap or metastable energy state 80. This contingency is represented by dotted line 78. Once in the metastable energy state 80, the trapped electron cannot again reach the conduction band 60 unless it absorbs an amount of energy ev'. equal to the energy difference between the metastable energy level or trap 80 and the bottom of the conduction band 60 of the crystal. Such a trapped electron could acquire the necessary amount of energy ev'. through thermal or vibrational agitation of the phosphor crystal to thus be released after some given length of time. Yet, for practical purposes, an electron, once trapped in a metastable energy state such as 80, does not contribute to the luminescing process. As depicted in FIG. 7, many different metastable energy states can be found in a given crystal.

The instant invention, via an optical stimulation technique, releases electrons trapped in metastable states such as 80 by imparting to these electrons a sufficient amount of energy ev'., for example, obtained not through thermal or vibrational agitation of the crystal, but from the actual incident radiation 62 of the various frequencies itself. Electrons so released contribute to the luminescing process simultaneously with the impingement of other incident radiation and thus add to the quantum efficiency of the energy conversion within the crystal.

Referring again to FIG. 6, to "release" an electron in the metastable state or trap 80, for example, energy equal to ev'. must be imparted to such electron. Similarly, to release an electron trapped in the metastable state 78, for example, a quantum of energy equal to ev. must be imparted to such electron. The same considerations apply for the release of electrons in all other metastable states of a given crystal, only two such states being depicted here for illustrative convenience. The question now remains as to how such discrete energies can be introduced into the crystal and specifically transferred to the trapped electrons therein. It should be appreciated that the energy levels ev'. and ev. are significantly smaller than the energy level denoted by the gap between the valence band 58 and the conduction band 60 of the crystal. As has been stated, the corresponding wavelength of incident radiation necessary to provide a quantum of energy equal to the main energy gap between the conduction and valence bands of most phosphors lies within the ultraviolet range. Accordingly, the incident radiation required to provide the lesser energy levels ev'. and ev. would necessarily have to be of longer wavelengths than ultraviolet. In other words, the wavelength of the incident radiation necessary to provide a quantum of energy ev'. or ev. must be longer than ultraviolet and, in fact, can be shown to fall within the visible and near-visible spectrum and sometimes specifically near the infrared range.

Thus, one would assume that if the incident radiation impinging upon a phosphor crystal such as zinc sulfide in this example had frequencies within the near visible, visible, and infrared ranges, then sufficient energy would be imparted to the electrons trapped in the "metastable" states so as to raise these electrons into the conduction band 60 of the phosphor. Yet, and referring again to FIG. 6, it has been shown that zinc sulfide, as is generally the case with all phosphors, is transparent to the visible, near visible, and infrared frequencies, and in fact, only absorbs incident radiation having frequencies within the ultraviolet range as evidenced by and discussed with respect to the absorption curve 54. Of course, unless the incident radiation is somehow absorbed, it would have virtually no effect upon the crystal and could not excite trapped electrons therein.

Thus, some technique is necessary so as to impart to a phosphor the ability to absorb the visible, near visible, and infrared frequencies so as to excite the trapped electrons in the metastable states back into the conduction band of the crystal itself. In this regard, I propose to utilize optical stimulation or cascade excitation techniques which would impart to a phosphor crystal the ability to absorb these energies necessary to free or release the trapped electrons.

Referring again to FIG. 6, it is to again be noted that zinc sulfide, for example, only normally absorbs wavelengths from 3,000 to 3,600 A. clearly lying within the ultraviolet zone. I have found that by the addition of arsenic, for example, an additional absorption zone is provided for the zinc sulfide crystal which occurs in the longer wavelengths necessary to provide the energy to release trapped electrons. Reference is made to the curve 80 of FIG. 6 depicting the extension of the absorption curve for zinc sulfide when arsenic is utilized as an additional activator. Other activators such as aluminum and cobalt also serve to extend the absorption range of the zinc sulfide crystal as evidenced by curves 81 and 83, respectively. It should be understood that these additional activators do not themselves provide luminescent centers within any given phosphor. Such additional activators, referred to as "excitation activators" herein below, are used to introduce several additional absorption bands of the spectral range as is necessary for the proper excitation of the electrons trapped in metastable energy levels. It is to be expressly understood that such additional activators should not be confused with the so-called "sensitizers" which do not shift the absorption characteristics of a crystal as do the "excitation activators" of the instant invention.

Some of the excitation energy absorbed by the additional activators, such energy lying within the longer wavelengths of the incident radiation, is transferred to the main or luminescent center providing activator, which may be copper, silver, or manganese in the case of the zinc sulfide crystal as is known, and reappears as light in the emission band characteristic of the main activator itself in combination with the crystal. In other words, the fluorescence of the phosphor is a composite one and includes the emission band of both the phosphor and the activator at relative intensities which depend upon their concentration.

It is believed, but not thoroughly understood, that the transfer of energy from activator to activator proceeds by a resonance process.

In summation of the above, it is thus proposed that excitation energy of an activator may be transferred to another activator or luminescent center in two manners, either as a direct transfer, or, when the second activator center is too remote, as stepwise transfer through the medium of intervening activators, defects, or impurity centers. This, of course, raises the valid question as to what losses of excitation energy occur during these transfer steps and further, how are these losses dependent on the relative concentrations of the activators. Data was accumulated in this regard and evidenced a net gain in quantum efficiency of the light conversion process of nominally 20 percent over normal by providing additional broadband spectrum or "energizing" activators, each functioning not as luminescent centers, but to absorb an additional amount of radiation having specific wavelengths, then transferring this energy to the main activator where accumulatively all the absorbed radiant energies are evidenced as light.

Referring again to FIG. 7, this cascade activation or optical stimulation process is diagrammatically illustrated. As stated above, additional or "excitation" activator materials have been introduced into the crystal, such additional activators not in and of themselves creating luminescent centers but merely being provided so as to absorb the longer wavelengths of incident radiation which the crystal, by itself, and/or with the addition of the main or luminescent center providing activator therein, would normally pass through. An additional or "excitation" activator impurity, such as arsenic in the case of zinc sulfide, is generally designated by reference numeral 82 in FIG. 7. The additional or energizing activator itself has an excited state 84 and a ground state 86. When incident radiation 63 having frequencies corresponding to the visible, near visible, and specifically infrared regions of the spectrum, impinges upon the energizing activator 82, such energy will be absorbed by the same. In the case of arsenic as the "energizing" activator here, energy having a wavelength of about 3,600 A. would be absorbed. Without the additional energizing activator 82, of course, such energy having these longer wavelengths would normally pass through the crystal.

An electron 88 at the ground state 86 of the energizing activator 82 would be excited by the impinging radiation 63 of the longer wavelength and raised into the excited state 84 of the energizing activator. The electron 88 would subsequently drop back into the ground or unexcited state 88 of the energizing activator 82 and, in the process, would emit a photon or quantum of energy 90. Again, in the case of arsenic as the additional or energizing activator here, the quantum of radiation 90 internally emitted has an energy of approximately 0.86 ev. The amount of energy contained in the quantum of photon 90, 0.86 ev., can be deemed substantially equal to ev'., the energy level of at least one of the known metastable states of zinc sulfide, and is the amount of energy needed to raise an electron caught in the metastable state or trap 80, for example, into the conduction band 60 of the crystal. Thus, when the quantum or photon 90 impinges upon an electron in trap 80, for example, the electron in the trap has imparted thereto additional energy in the amount ev'. and is thus raised into the conduction band 60 of the crystal thereafter finding its way to the luminescent center 70 and producing a photon 76 of visible light.

For each different metastable state or trap occurring within a given crystal, and the ranges of the metastable states or parameters are known or can be determined by experiment as has been discussed, a specific additional or energizing activator impurity 82 would be introduced into the crystal such that the crystal would absorb radiation having specific required longer wavelengths and subsequently, through this optical stimulation or cascade excitation process, impart sufficient energy to the trapped electrons so as to release the same back into the conduction band of the crystal. Again, as above discussed, in the case of a zinc sulfide phosphor, the addition of the excitation activators aluminum and cobalt serves to release electrons trapped in other known metastable states of the crystals having different energy levels. While different excitation activators are utilized for each respectively different metastable state of the crystal, it should be appreciated that the percentage amount of a given energizing activator provided is in proportion to the quantity of metastable states found at the same energy level within the crystal. For a zinc sulfide phosphor normally activated with copper, silver, or manganese to provide the luminescent center, for example, 0.05 to 0.8 percent arsenic, 0.1 to 2.0 percent aluminum, and 0.2 to 4.0 percent cobalt have been found to be suitable, although 0.4 percent arsenic, 1 percent aluminum, and 2 percent cobalt are preferred. For a barium-calcium pyrophosphate crystal normally activated with zinc, for example, the addition of 0.2 to 1.8 percent each of magnesium, manganese, strontium, and tin suitably provide the energizing activators necessary to release electrons from the metastable states although 1 percent concentrations are preferred. With a barium pyrophosphate crystal normally activated with tin, the necessary energizing activators are provided by antimony and lanthanum in preferred amounts of 1 percent each, although concentrations in the range of 0.2 to 1.8 percent are suitable. Applying the inventive principles taught herein, those skilled in the art can easily determine the necessary energizing activators for any given known phosphor to thus increase the energy conversion efficiency therein.

Thus, from a structural standpoint once again, the instant invention differs in a novel fashion from the prior art by the provision, in known phosphor crystals, of additional or excitation activator elements heretofore not utilized in nor thought to impart advantages to a given crystal.

Attention is now directed to FIG. 8 of the appended drawings wherein the spectral intensities emitted from the gas discharge tube utilized as the source of radiation for the instant invention is disclosed. This source of radiation comprises a discharge tube, as mentioned above, from which the phosphor materials normally found on the inside surface thereof have been removed and physically displaced from the excitation wave front as discussed at the outset of this specification. The radiation source, consistent with the instant invention, is contemplated to provide not only radiation within the ultraviolet ranges, but also sufficient radiation within the visible, near visible, and infrared ranges so as to optically stimulate or excite, in a cascade manner, the additional or energizing activators introduced into a given crystal. In this regard, it will be noted that the discharge tube utilized herein primarily contains mercury vapor to provide the main ultraviolet radiation, but also contains a mixture of noble gases such as helium, neon, and argon in amounts within the range of 1 to 3 percent for helium and neon and about 94 percent for argon. Accordingly, the spectral frequencies of the output radiation from the discharge tube of the instant invention is the cumulative spectral line radiation provided by each of the gases and the vapor within the tube, such spectral frequencies and the particular intensities of each gas or vapor being depicted in FIG. 8.

It should bow be apparent that the objects initially set forth at the outset of this specification have been successfully achieved. Accordingly,

What I claim is:

1. A lighting system comprising radiation means for generating radiation having ultraviolet, visible and near-visible wavelengths, and a thin sheet of luminescent material means physically displaced from said radiation means and simultaneously responsive to predetermined portions of said wavelengths of said generated radiation to emit visible light, and wherein said luminescent material means comprises inorganic phosphor solids suspended in a medium or organically activated polymers, activator means in said phosphor solids for providing luminescent centers, and separate energizing activator means in said phosphor solids for absorbing at least predetermined portions of said generated radiation having near-visible and visible wavelengths.

2. A lighting system as defined in claim 1, wherein said radiation means comprises a gas discharge tube containing mercury vapor and a mixture of noble gases.

3. A lighting system as defined in claim 2, wherein said mixture of noble gases in said gas discharge tube includes helium and neon in amounts within the range of 1—3 percent and argon in an amount in excess of 90 percent.

4. A lighting system as defined in claim 2, further including housing means, and wherein said gas discharge tube means is disposed in said housing means and wherein said thin sheet of luminescent material is disposed inside said housing means.

5. A lighting system as defined in claim 4, wherein said housing means defines a substantially closed compartment having at least one surface that is at least translucent to visible light, said thin sheet of luminescent material being further disposed on the inside of said housing means upon said at least one surface.

6. A lighting system as defined in claim 2 further including a plate of at least translucent material, and wherein said thin sheet of luminescent material is disposed on said plate in the path of radiation from said gas discharge tube means.

7. A lighting system comprising radiation means for generating radiation having ultraviolet, visible and near-visible wavelengths, said radiation means comprising a gas discharge tube containing mercury vapor and a mixture of noble gases, and a thin sheet of luminescent material means physically displaced from said radiation means and simultaneously responsive to predetermined portions of said wave lengths of said generated radiation to emit visible light, said system further including a plate of at least translucent material, said thin sheet of luminescent material being disposed on said plate in the path of radiation from said gas discharge tube means, and wherein said thin sheet of luminescent material comprises a layer of polyvinyl fluoride film containing phosphor particles, protecting layers of polyvinyl fluoride disposed on either side of said polyvinyl fluoride film, and an adhesive layer disposed on one of said polyvinyl fluoride layers.

8. A light-producing system comprising a source of ultraviolet, near-visible, and visible spectral radiation; and a phosphor means simultaneously responsive to at least predetermined portions of said spectral radiation for luminescing, and wherein said phosphor means comprises a zinc sulfide crystal, at least one chemical activator therein, and chemical impurities therein selected from the group consisting of arsenic, aluminum, cobalt, and combinations thereof.

9. A light-producing system as defined in claim 8 wherein said radiation source comprises a gas discharge tube containing mercury vapor and a mixture of helium and neon in amounts within the range of 1—3 percent and argon in an amount in excess of 90 percent.

10. A light-producing system as defined in claim 9 wherein said phosphor means is physically displaced from said gas discharge tube.

11 A light-producing system comprising a source of ultraviolet, near-visible, and visible spectral radiations; and a phosphor means simultaneously responsive to at least predetermined portions of said spectral radiation for luminescing, and wherein said phosphor means comprises a barium-calcium pyrophosphate crystal, at least one chemical activator therein, and chemical impurities therein selected from the group consisting of magnesium, manganese, strontium, tin, and combinations thereof.

12. A light-producing system as defined in claim 11 wherein said radiation source comprises a gas discharge tube containing mercury vapor and a mixture of helium and neon in amounts within the range of 1—3 percent and argon in an amount in excess of 90 percent.

13. A light-producing system as defined in claim 12 wherein said phosphor means is physically displaced from said gas discharge tube.

14. A light-producing system comprising a source of ultraviolet, near-visible, and visible spectral radiation; and a phosphor means simultaneously responsive to at least predetermined portions of said spectral radiation for luminescing, and wherein said phosphor means comprises a barium pyrophosphate crystal, at least one chemical activator therein, and chemical impurities therein selected from the group consisting of antimony, lanthanum, and combinations thereof.

15. A light-producing system as defined in claim 14 wherein said radiation source comprises a gas discharge tube containing mercury vapor and a mixture of helium and neon in amounts within the range of 1—3 percent and argon in an amount in excess of 90 percent.

16. A light-producing system as defined in claim 15 wherein said phosphor means is physically displaced from said gas discharge tube.

17. A light-producing system comprising a source of ultraviolet, near-visible, and visible spectral radiation; and a phosphor means simultaneously responsive to at least predetermined portions of said spectral radiation for luminescing, and wherein said phosphor means comprises a phosphor crystal having chemical impurities and physical defects therein creating metastable energy states, activator means within said phosphor crystal for providing luminescent centers therein, and energizing activator means within said crystal responsive to predetermined portions of near-visible and visible spectral radiation for internally releasing quantums of energy in said crystal substantially equal to the difference in the energy level of at least one of said metastable states compared with the energy level associated with the conduction band of said crystal.

18. A light-producing system comprising a source of ultraviolet, near-visible, and visible spectral radiations; and a phosphor means simultaneously responsive to at least predetermined portions of said spectral radiation for luminescing, and wherein said phosphor means comprises inorganic phosphor solids suspended in a medium of organically activated polymers, activator means in said phosphor solids for providing luminescent centers, and separate energizing activator means in said phosphor solids for absorbing at least predetermined portions of said generated radiation having near-visible and visible wavelengths.